US012552543B2

(12) United States Patent
Gao et al.

(10) Patent No.: US 12,552,543 B2
(45) Date of Patent: Feb. 17, 2026

(54) EMERGENCY ENERGY RESERVE SOLUTION FOR BATTERY ELECTRIFIED AIRCRAFT

(71) Applicant: Wisk Aero LLC, Mountain View, CA (US)

(72) Inventors: Rui Gao, Santa Clara, CA (US); Michael John Burgart, Los Altos, CA (US); Geoffrey Alan Long, Montara, CA (US)

(73) Assignee: Wisk Aero LLC, Mountain View, CA (US)

( * ) Notice: Subject to any disclaimer, the term of this patent is extended or adjusted under 35 U.S.C. 154(b) by 44 days.

(21) Appl. No.: 18/414,676

(22) Filed: Jan. 17, 2024

(65) Prior Publication Data
US 2024/0239500 A1 Jul. 18, 2024

Related U.S. Application Data

(60) Provisional application No. 63/439,413, filed on Jan. 17, 2023.

(51) Int. Cl.
*B64D 27/24* (2024.01)
*B60L 50/60* (2019.01)
(Continued)

(52) U.S. Cl.
CPC ............ *B64D 27/357* (2024.01); *B60L 50/60* (2019.02); *B60L 2200/10* (2013.01);
(Continued)

(58) Field of Classification Search
CPC .............. B64D 27/357; B64D 2221/00; B60L 50/60; B60L 2200/10; B60L 2210/00; B64C 29/0008
See application file for complete search history.

(56) References Cited

U.S. PATENT DOCUMENTS 9,270,113 B2 * 2/2016 Bellis ...................... H02J 1/108
11,667,393 B2 * 6/2023 Chen ........................ H02J 1/106
701/3

(Continued)

FOREIGN PATENT DOCUMENTS

WO 2022200732 A1 9/2022

OTHER PUBLICATIONS

PCT/US2024/011741 , "International Search Report and Written Opinion", Apr. 29, 2024, 14 pages.

*Primary Examiner* — Rexford N Barnie
*Assistant Examiner* — Esayas G Yeshaw
(74) *Attorney, Agent, or Firm* — Kilpatrick Townsend & Stockton LLP

(57) ABSTRACT

A power distribution control approach employs power distribution buses that are controllably energized and de-energized to control which aerial vehicle systems received power based on the applicable operational mode. A method of controlling power distribution in an electrically powered vertical takeoff and landing aircraft includes receiving an operational mode indication that identifies an operational mode. The operational mode is one of predetermined operational modes for the aircraft. Power distribution buses of the aircraft are controlled, based on the operational mode indication, to control each of the power distribution buses to be energized or de-energized.

27 Claims, 7 Drawing Sheets

(51) Int. Cl.
*B64D 27/357* (2024.01)
*B64C 29/00* (2006.01)

(52) U.S. Cl.
CPC ....... *B60L 2210/00* (2013.01); *B64C 29/0008* (2013.01); *B64D 2221/00* (2013.01)

(56) References Cited

U.S. PATENT DOCUMENTS

| | | | | |
|---|---|---|---|---|
| 11,708,159 | B2* | 7/2023 | Marshall | B64D 29/02 244/7 A |
| 12,095,405 | B2* | 9/2024 | Loder | B64D 27/33 |
| 2014/0054957 | A1 | 2/2014 | Bellis | |
| 2020/0361324 | A1 | 11/2020 | Evans | |
| 2022/0185493 | A1 | 6/2022 | Chen et al. | |
| 2022/0219827 | A1* | 7/2022 | Knapp | B64D 41/007 |
| 2023/0303257 | A1* | 9/2023 | Pereira | B60L 50/50 |
| 2023/0348079 | A1* | 11/2023 | Gajanayake | B64D 27/34 |

* cited by examiner

EMERGENCY ENERGY RESERVE SOLUTION FOR BATTERY ELECTRIFIED AIRCRAFT

RELATED APPLICATIONS

This application claims benefit under 35 USC§ 119(e) to U.S. Provisional Patent Application No. 63/439,413 filed Jan. 17, 2023, and entitled "Emergency Energy Reserve Solution for Battery Electrified Aircraft," the disclosure of which is incorporated by reference herein in its entirety for all purposes.

BACKGROUND

Passenger aircraft safety regulations include requirements directed to ensuring the aircraft is capable of continued safe flight and landing for failure conditions that are not extremely improbable. For example, critical flight control systems, such as control surface systems (e.g., ailerons, elevators, rudder, etc.) and avionics, may need to have sufficient redundancy and/or reliability to ensure the aircraft is capable of continued safe flight and landing for some failure conditions.

Electrically powered vertical takeoff and landing passenger aircraft have configurational differences relative to conventional fuel-powered aircraft that are associated with further considerations for ensuring the aircraft is capable of continued safe flight and landing. These additional considerations include the reliability and/or redundancy of the electrical power distribution system as well as the varying state of charge of the batteries.

BRIEF SUMMARY

The following presents a simplified summary of some embodiments of the invention to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Approaches and systems for controlling power distribution in an aerial vehicle employ power distribution buses that are controllably energized and de-energized based on the operational mode of the aerial vehicle. The ability to selectively energize and/or de-energize the power distribution buses can be used to enhance safety in the operational mode. For example, one or more power distributions buses that supply power to non-critical subsystems can be de-energized when necessary to ensure the remaining available battery power is dedicated to critical subsystems necessary for continued safe flight and landing. In some embodiments, at least one direct current (DC) to DC converter is employed to generate a regulated low-voltage output from a high-voltage battery in a low state of charge, thereby providing electrical power for flight critical low-voltage subsystems, such as control systems and avionics.'

Thus, in one aspect, a method of controlling power distribution in an electrically powered vertical takeoff and landing aircraft is provided. The method includes receiving an operational mode indication that identifies an operational mode of the aircraft. The operational mode is one of predetermined operational modes for the aircraft. The method further includes controlling power distribution buses of the aircraft, based on the operational mode indication, to control each of the power distribution buses to be energized or de-energized.

In some embodiments of the method, the power distribution buses include a propulsion power bus, an air-conditioning power bus, and at least one subsystems bus. The propulsion power bus is configured to supply power to propulsion system motors of the aircraft. The air-conditioning power bus is configured to supply power to an air-conditioning system of the aircraft. The at least one subsystems bus is configured to supply power to subsystems of the aircraft. In some embodiments of the method, the at least one subsystems bus includes a first subsystems bus and a second subsystems bus. Each of the first subsystems bus and the second subsystems bus can be configured to supply power to the subsystems of the aircraft to provide redundancy.

In some embodiments of the method, the predetermined operational modes include a normal flight mode and an emergency flight mode. In the normal flight mode, each of the propulsion power bus, the air-conditioning power bus, and the at least one subsystems bus is energized. In the emergency flight mode, the air-conditioning power bus is de-energized and each of the propulsion power bus and the at least one subsystems bus is energized. In some embodiments of the method, the predetermined operational modes further include an emergency landing mode in which the at least one subsystems bus is energized and each of the propulsion power bus and the air-conditioning power bus is de-energized.

In another aspect, an aerial vehicle includes electrically powered propulsion units, an air-conditioning system, electrically powered subsystems, a propulsion power bus, an air-conditioning power bus, at least one subsystems bus, a control unit, and a memory device. The propulsion power bus is configured to supply electrical power to the propulsion units. The air-conditioning power bus is configured to supply electrical power to the air-conditioning system. The at least one subsystems bus is configured to supply electrical power to the subsystems. The control unit includes at least one processor. The memory device stores non-transitory instructions executable by the at least one processor to cause the at least one processor to control each of the propulsion power bus, the air-conditioning power bus, and the at least one subsystems bus, based on an indicated operational mode, to be energized or de-energized. The indicated operational mode is one of predetermined operational modes for the aerial vehicle. In some embodiments of the aerial vehicle, the at least one subsystems bus includes a first subsystems bus and a second subsystems bus. Each of the first subsystems bus and the second subsystems bus can be configured to supply power to the subsystems of the aerial vehicle to provide redundancy.

In some embodiments of the aerial vehicle, the predetermined operational modes include a normal flight mode and an emergency flight mode. In the normal flight mode, each of the propulsion power bus, the air-conditioning power bus, and the at least one subsystems bus is energized. In the emergency flight mode, the air-conditioning power bus is de-energized and each of the propulsion power bus and the at least one subsystems bus is energized. In some embodiments of the aerial vehicle, the predetermined operational modes further include an emergency landing mode in which the at least one subsystems bus is energized and each of the propulsion power bus and the air-conditioning power bus is de-energized.

For a fuller understanding of the nature and advantages of the present invention, reference should be made to the ensuing detailed description and accompanying drawings.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
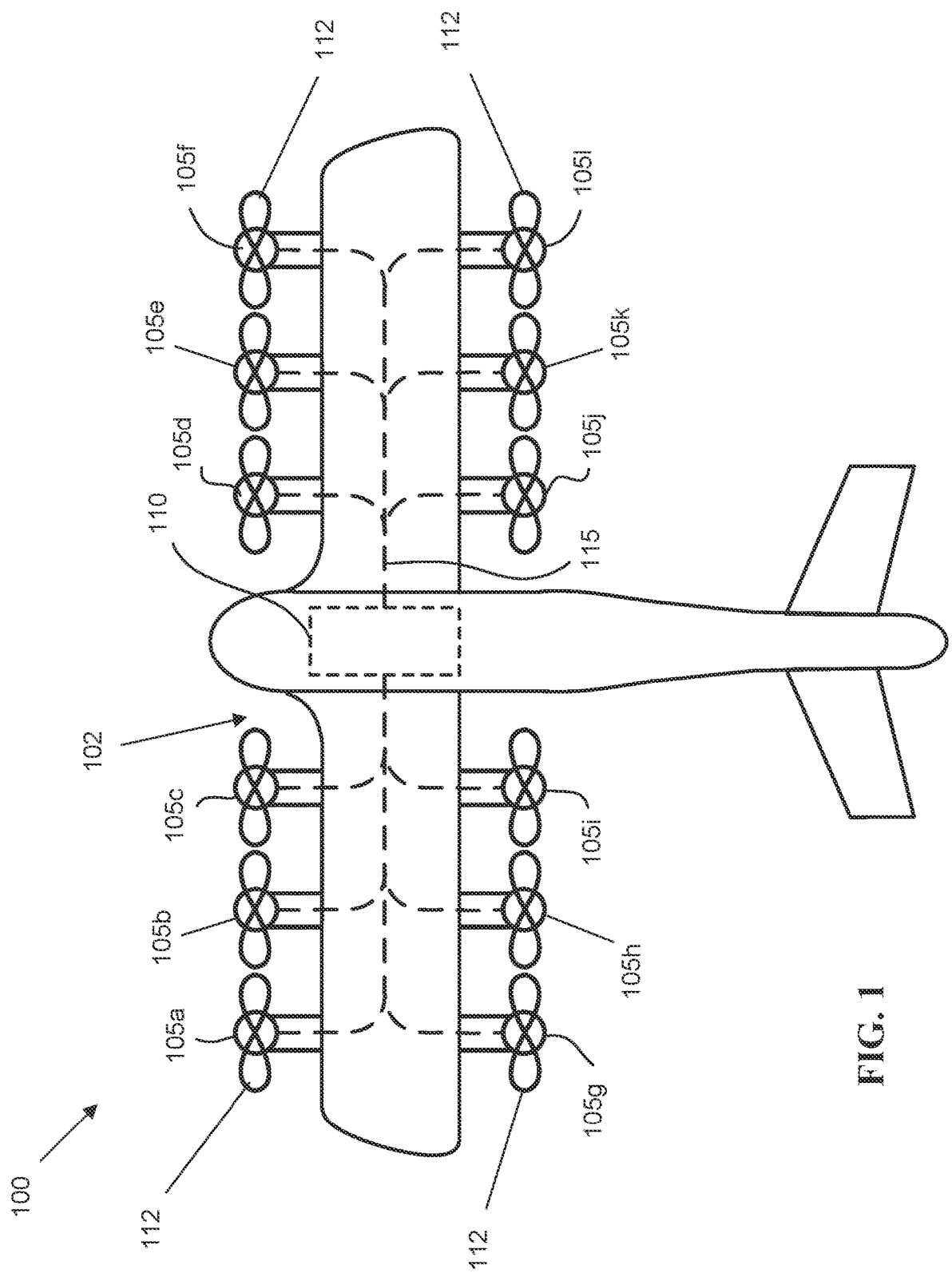
FIG. 1 depicts an electrically powered aerial vehicle that includes a power distribution system, in accordance with embodiments.

Turning now to the drawing figures in which similar reference identifiers are used to designate similar elements in the various figures, FIG. 1 depicts an electrically powered aerial vehicle 100 that includes a power distribution system 102, in accordance with embodiments. As shown in FIG. 1, the aerial vehicle 100 includes twelve motors 105a-105l. The power distribution system 102 includes batteries 110 and a high-voltage distribution subsystem 115 via which the twelve motors 105a-105l are coupled to the batteries 110. In many embodiments, each of the twelve motors 105a-105l are used to drive propulsion fans 112 (e.g., tiltable lift/propulsion fans) and are configured to operate on a relatively high supply voltage (e.g., 792 V max), which is supplied by the batteries 110.

In addition to the motors 105a-105l, the aerial vehicle 100 includes low-voltage systems that are also powered by the batteries 110. The low-voltage systems include 24 motor controllers (MC) (two for each of the 12 motors to provide redundancy), 6 tilt actuators (T-act) (1 per each tilt mechanism used to tilt a corresponding pair of the motors mounted on a respective pylon), 4 aileron actuators (A-act), 2 elevator actuators (E-act), 1 rudder actuator (R-act), avionics units (A-units), passenger system line replaceable units (PAX-LRUs), lights, and miscellaneous other low-voltage systems. Each of the low-voltage systems is configured to operate on a relatively low voltage power (e.g., 28 V nominal).

Figure 2:
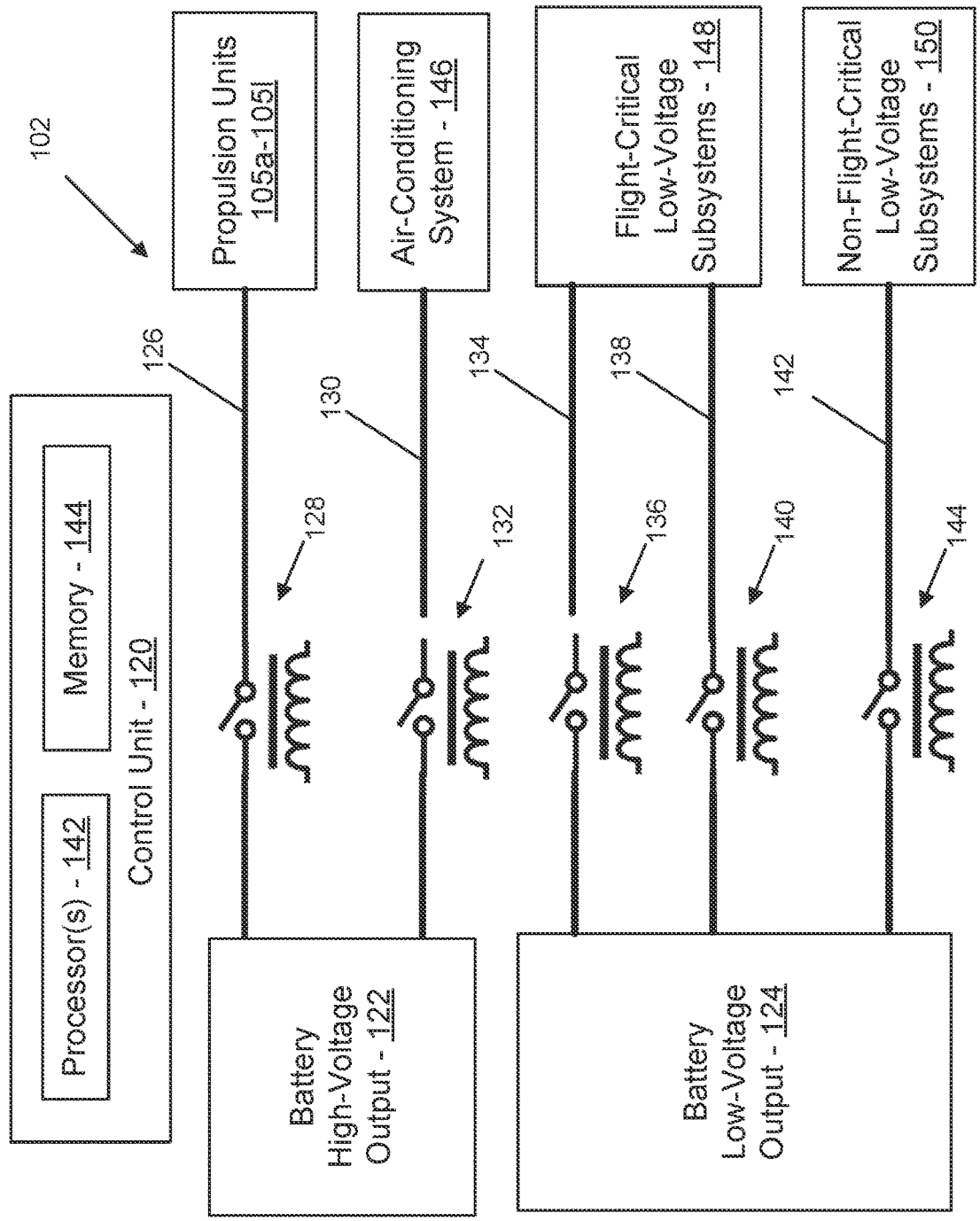
FIG. 2 schematically illustrates aspects of the power distribution system of FIG. 1 including power distribution buses that can be controllably energized and de-energized.

FIG. 2 schematically illustrates aspects of the power distribution system 102, in accordance with embodiment. The power distribution system 102 includes a control unit 120, a battery high-voltage output 122, a battery low-voltage output 124, a propulsion power bus 126, a propulsion power bus solenoid relay 128, an air-conditioning power bus 130, an air-conditioning power bus solenoid relay 132, a first subsystems bus 134, a first subsystems bus solenoid relay 136, a second subsystems bus 138, a second subsystems bus solenoid relay 140, a third subsystems bus 142, and a fourth subsystems bus solenoid relay 144. The propulsion power bus 126 is connected to and configured to supply electrical power to the propulsion motors 105a-105l. The aerial vehicle 100 includes an air-conditioning system 146 for the passenger cabin of the aerial vehicle 100. The air-conditioning power bus 130 is connected to and configured to supply electrical power to the air-conditioning system 146. The aerial vehicle 100 includes flight-critical low-voltage subsystems 148, which include the 24 motor controllers (MC), the 6 tilt actuators (T-act), the 4 aileron actuators (A-act), the 2 elevator actuators (E-act), the rudder actuator (R-act), and the avionics units (A-units). The aerial vehicle 100 includes non-flight-critical low-voltage subsystems 150, which include the passenger system line replaceable units (PAX-LRUs), the lights, and the miscellaneous other non-flight-critical low-voltage systems described herein. Each of the first subsystems bus 134 and the second subsystems bus 138 is connected to and configured to supply electrical power to the flight-critical low-voltage subsystems 148.

The control unit 120 includes one or more processors 142 and a memory 144. The memory 144 stores non-transitory instructions executable by the control unit 120 to cause the control unit 120 to control the solenoid relays 128, 132, 136, 140, 144 as described herein. The control unit 120 is connected to and configured to control each of the propulsion power bus solenoid relay 128, the air-conditioning power bus solenoid relay 132, the first subsystems bus solenoid relay 136, the second subsystems bus solenoid relay 140, and the third subsystems bus solenoid relay 144. The propulsion power bus solenoid relay 128 is connected between the battery high-voltage output 122 and the propulsion power bus 126. The propulsion power bus solenoid relay 128 is controllable by the control unit 120 to connect the propulsion power bus 126 to the battery high-voltage output 122 to energize the propulsion power bus 126 to supply power to the propulsion motors 105a-105l. The propulsion power bus solenoid relay 128 is controllable by the control unit 120 to disconnect the propulsion power bus 126 from the battery high-voltage output 122 to de-energize the propulsion power bus 126 to block supply of power to the propulsion motors 105a-105l. The air-conditioning power bus solenoid relay 132 is controllable by the control unit 120 to connect the air-conditioning power bus 130 to the battery high-voltage output 122 to energize the air-conditioning power bus 130 to supply power to the air-conditioning system 146. The air-conditioning power bus solenoid relay 132 is controllable by the control unit 120 to disconnect the air-conditioning power bus 130 from the battery high-voltage output 122 to de-energize the air-conditioning power bus 130 to block supply of power to the air-conditioning system 146. The first subsystems power bus solenoid relay 136 is controllable by the control unit 120 to connect the first subsystems power bus 134 to the battery low-voltage output 124 to energize the first subsystems power bus 134 to supply power to the flight-critical low-voltage subsystems 148. The first subsystems power bus solenoid relay 136 is controllable by the control unit 120 to disconnect the first subsystems power bus 134 from the battery low-voltage output 124 to de-energize the first subsystems power bus 134 to block supply of power to the flight-critical low-voltage subsystems 148 via the first subsystems power bus 134. The second subsystems power bus solenoid relay 140 is controllable by the control unit 120 to connect the second subsystems power bus 138 to the battery low-voltage output 124 to energize the second subsystems power bus 138 to supply power to the flight-critical low-voltage subsystems 148. The second subsystems power bus solenoid relay 140 is controllable by the control unit 120 to disconnect the second subsystems power bus 138 from the battery low-voltage output 124 to de-energize the second subsystems power bus 138 to block supply of power to the flight-critical low-voltage subsystems 148 via the second subsystems power bus 138. The third subsystems power bus solenoid relay 144 is controllable by the control unit 120 to connect the third subsystems power bus 142 to the battery low-voltage output 124 to energize the third subsystems power bus 142 to supply power to the non-flight-critical low-voltage subsystems 150. The third subsystems power bus solenoid relay 144 is controllable by the control unit 120 to disconnect the third subsystems power bus 142 from the battery low-voltage output 124 to de-energize the third subsystems power bus 142 to block supply of power to the non-flight-critical low-voltage subsystems 150 via the second subsystems power bus 138.

Figure 3:
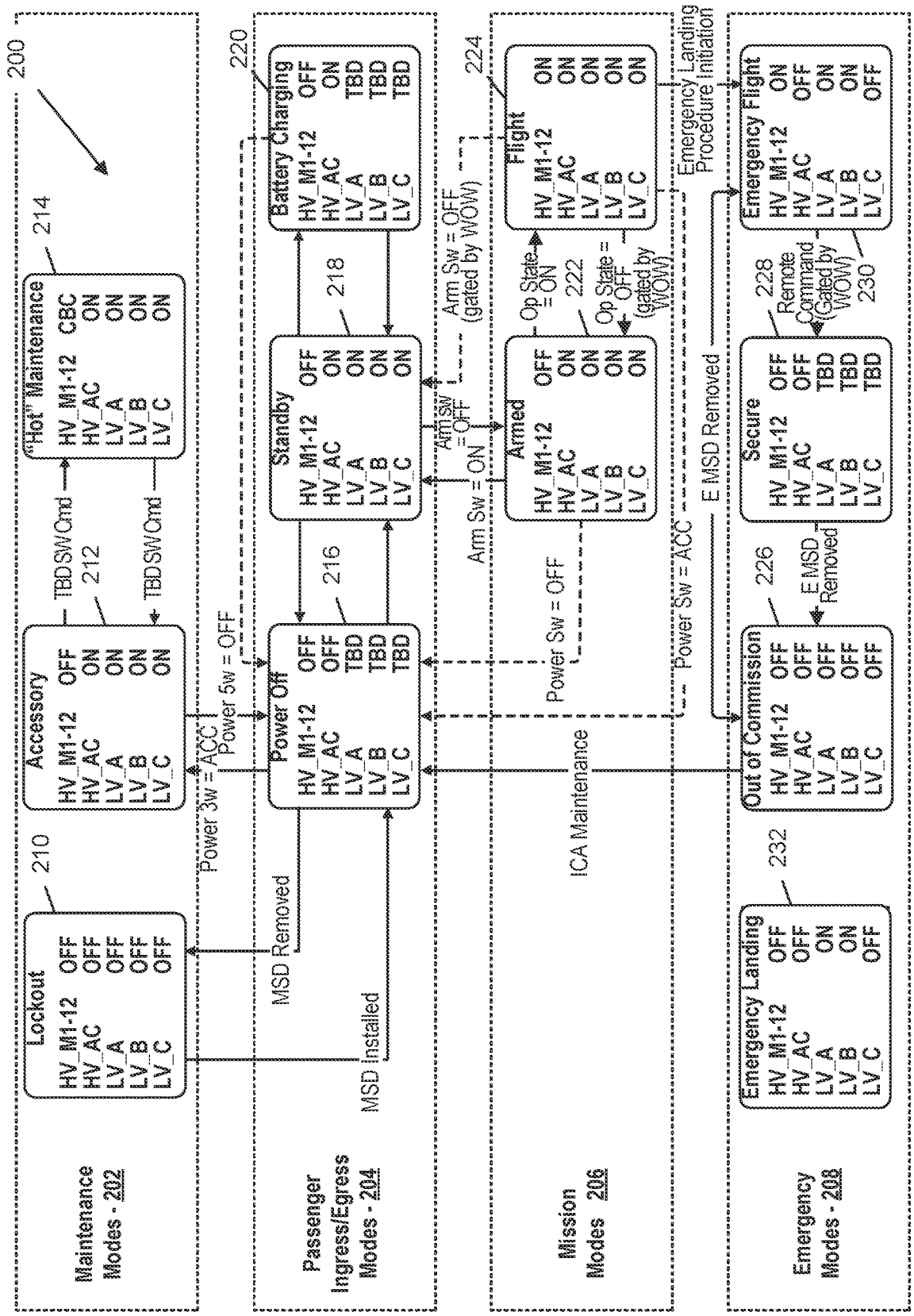
FIG. 3 schematically illustrates example aircraft operational modes and corresponding energization states of the power distribution buses of FIG. 2.

FIG. 3 schematically illustrates operational modes 200 for the aerial vehicle 100. The operational modes 200 include maintenance modes 202, passenger ingress/egress modes 204, mission modes 206, and emergency modes 208.

The maintenance modes 202 are suitable for use during maintenance of the aerial vehicle 100. The maintenance modes 202 include a maintenance lockout mode 210, a maintenance accessory mode 212, and a hot maintenance mode 214. In the maintenance lockout mode 210, each of the propulsion power bus 126, the air-conditioning power bus 130, the first subsystems power bus 134, the second subsystems power bus 138, and the third subsystems power bus 142 is de-energized, thereby blocking supply of power to the propulsion motors 105*a*-105*l*, the air-conditioning system 146, the flight-critical low-voltage subsystems 148, and the non-flight-critical low-voltage subsystems 150. In the maintenance accessory mode 212, the propulsion power bus 126 is de-energized and each of the air-conditioning power bus 130, the first subsystems bus 134, the second subsystems bus 138, and the third subsystems bus 142 is energized, thereby blocking supply of power to the propulsion motors 105*a*-105*l* and supplying power to each of the air-conditioning system 146, the flight-critical low-voltage subsystems 148, and the non-flight-critical low-voltage subsystems 150. In the hot maintenance mode 214, each of the propulsion power bus 126, the air-conditioning power bus 130, the first subsystems power bus 134, the second subsystems power bus 138, and the third subsystems power bus 142 is energized, thereby supplying power to the propulsion motors 105*a*-105*l*, the air-conditioning system 146, the flight-critical low-voltage subsystems 148, and the non-flight-critical low-voltage subsystems 150.

The passenger ingress/egress modes 204 are suitable for use during loading and unloading of the aerial vehicle 100. The passenger ingress/egress modes 204 include a power off mode 216, a standby mode 218, and a battery charging mode 222. In the power off mode 216, each of the propulsion power bus 126 and the air-conditioning power bus 130 is de-energized, thereby blocking supply of power to the propulsion motors 105*a*-105*l* and the air-conditioning system 146. In the power off mode 216, each of the first subsystems bus 134, the second subsystems bus 138, and the third subsystems bus 142 can be energized or can be de-energized depending on whether supply of power to the low-voltage subsystems 148, 150 is desired. In the standby mode 218, the propulsion power bus 126 is de-energized and each of the air-conditioning power bus 130, the first subsystems bus 134, the second subsystems bus 138, and the third subsystems bus 142 is energized, thereby blocking supply of power to the propulsion motors 105*a*-105*l* and supplying power to each of the air-conditioning system 146 and the low-voltage subsystems 148, 150. In the battery charging mode 220, the propulsion power bus 126 is de-energized and the air-conditioning power bus 130 is energized, thereby blocking supply of power to the propulsion motors 105*a*-105*l* and supplying power to the air-conditioning system 146. In the battery charging mode 220, each of the first subsystems bus 134, the second subsystems bus 138, and the third subsystems bus 142 can be energized or can be de-energized depending on whether supply of power to the low-voltage subsystems 148, 150 is desired.

The mission modes 206 are suitable for use during normal ground and flight mission segments of the aerial vehicle 100. The mission modes 206 include an armed mode 222 and a flight mode 224. In the armed mode 222, the propulsion power bus 126 is de-energized and each of the air-conditioning power bus 130, the first subsystems power bus 134, the second subsystems power bus 138, and the third subsystems bus 142 is energized, thereby blocking supply of power to the propulsion motors 105*a*-105*l* and supplying power to each of the air-conditioning system 146 and the low-voltage subsystems 148, 150. In the flight mode 224, each of the propulsion power bus 126, the air-conditioning power bus 130, the first subsystems bus 134, the second subsystems bus 138, and the third subsystems bus 142 is energized, thereby supplying power to the propulsion motors 105*a*-105*l*, the air-conditioning system 146, and the low-voltage subsystems 148, 150.

The emergency modes 208 are suitable for use during emergency situations. The emergency modes 208 include an out-of-commission mode 226, a secure mode 228, an emergency flight mode 230, and an emergency landing mode 232. In the out-of-commission mode 226, each of the propulsion power bus 126, the air-conditioning power bus 130, the first subsystems power bus 134, the second subsystems power bus 138, and the third subsystems power bus 142 is de-energized, thereby blocking supply of power to the propulsion motors 105*a*-105*l*, the air-conditioning system 146, and the low-voltage subsystems 148, 150. In the secure mode 228, each of the propulsion power bus 126 and the air-conditioning power bus 130 is de-energized, thereby blocking supply of power to the propulsion motors 105*a*-105*l* and the air-conditioning system 146. In the emergency flight mode 230, each of the air-conditioning power bus 130 and the third subsystems power bus 142 is de-energized and each of the propulsion power bus 126, the first subsystems power bus 134, and the second subsystems power bus 138 is energized, thereby blocking supply of power to the air-conditioning system 146 and the non-flight critical low-voltage systems 150 and supplying power to each of the propulsion motors 105*a*-105*l* and the flight-critical low-voltage subsystems 148. In the emergency landing mode 232, each of the propulsion power bus 126, the air-conditioning power bus 130, and the third subsystems bus 142 is de-energized and each of the first subsystems power bus 134 and the second subsystems power bus 138 is energized, thereby blocking supply of power to the propulsion motors 105a-105l, the air-conditioning system 146, and the non-flight-critical low-voltage subsystems 150 and supplying power to the flight-critical low-voltage subsystems 148.

Figure 4:
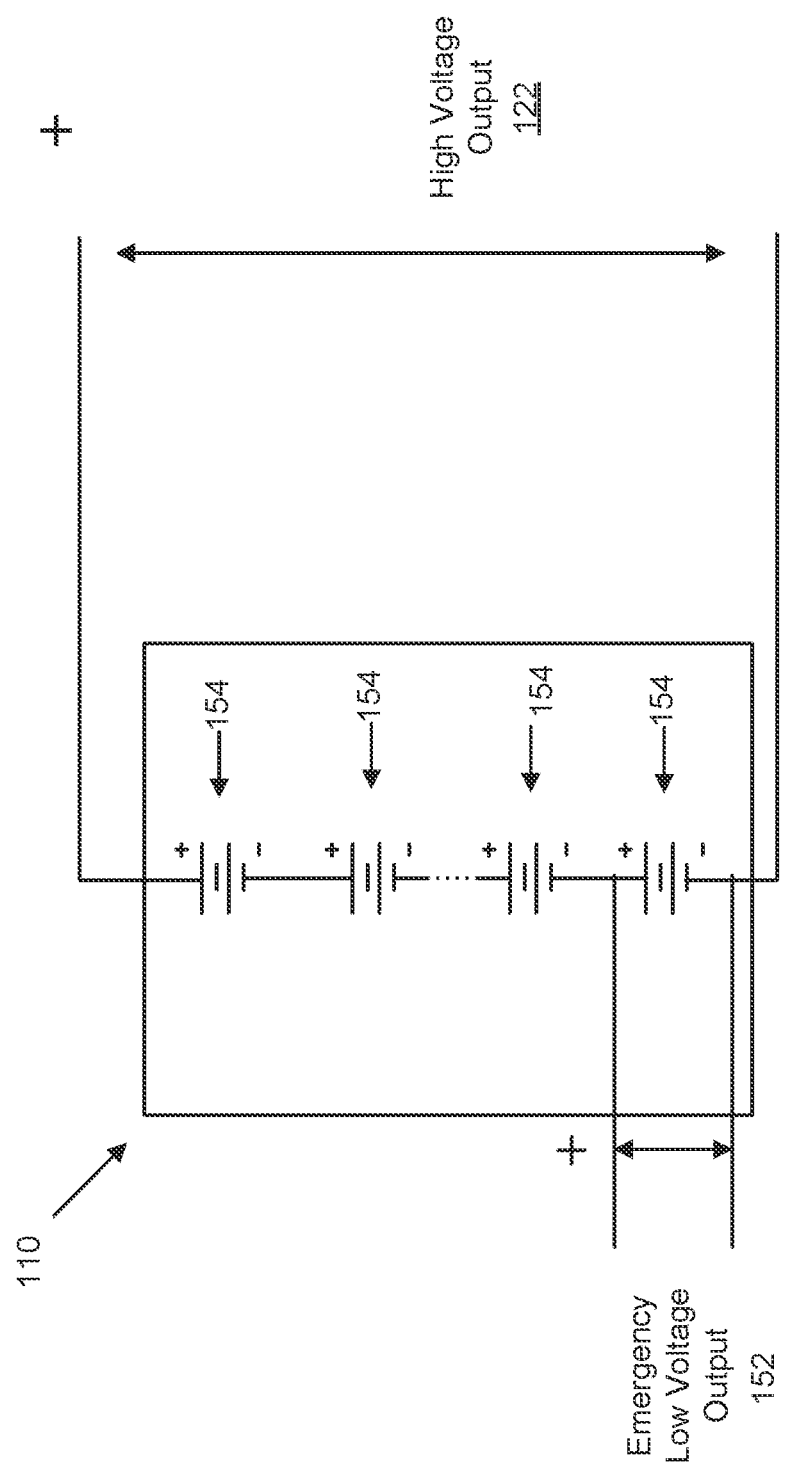
FIG. 4 schematically illustrates an approach for producing a high-voltage output and a low-voltage output that can be employed in the power distribution system of FIG. 1.
Figure 5:
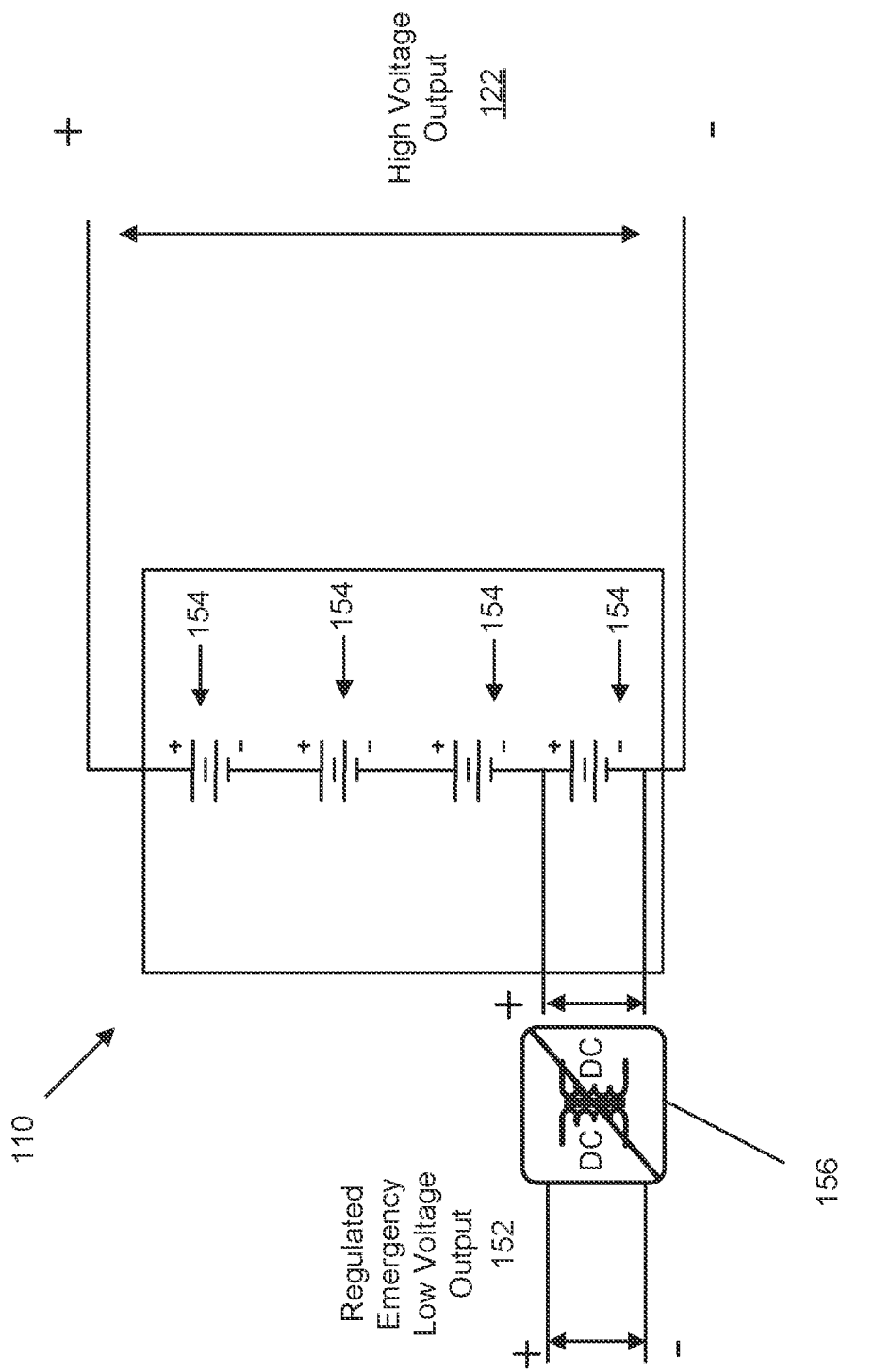
FIG. 5 schematically illustrates an approach for producing a high-voltage output and a regulated low-voltage output that can be employed in the power distribution system of FIG. 1.

FIG. 4 schematically illustrates an approach for producing the high-voltage output 122 and an emergency low-voltage output 152 from the batteries 110. The emergency low-voltage output 152 can be used to provide any suitable portion of the low-voltage output 124. In the illustrated embodiment, the batteries 110 includes four battery cells 154 connected in series to generate the high-voltage output 122. The emergency low-voltage output 152 is generated by one of the battery cells 154. The emergency low-voltage output 152 can be generated by any suitable combination of the battery cells 154 connected in parallel, such as two, three, or all four of the battery cells 154 connected in parallel. The batteries 110 can have any suitable number of the battery cells 154 including, but not limited to, four, five, six, seven, eight, or more of the battery cells 154. The high-voltage output 122 can be supplied to the propulsion power bus 126 and the air-conditioning power bus 130 as described herein. The emergency low-voltage output 152 can be supplied to the first subsystems power bus 134 and the second subsystems power bus 138 as described herein. FIG. 5 schematically illustrates a variation of the approach of FIG. 4 that employs a DC to DC voltage converter 156 to regulate the voltage of the emergency low-voltage output 152.

Figure 6:
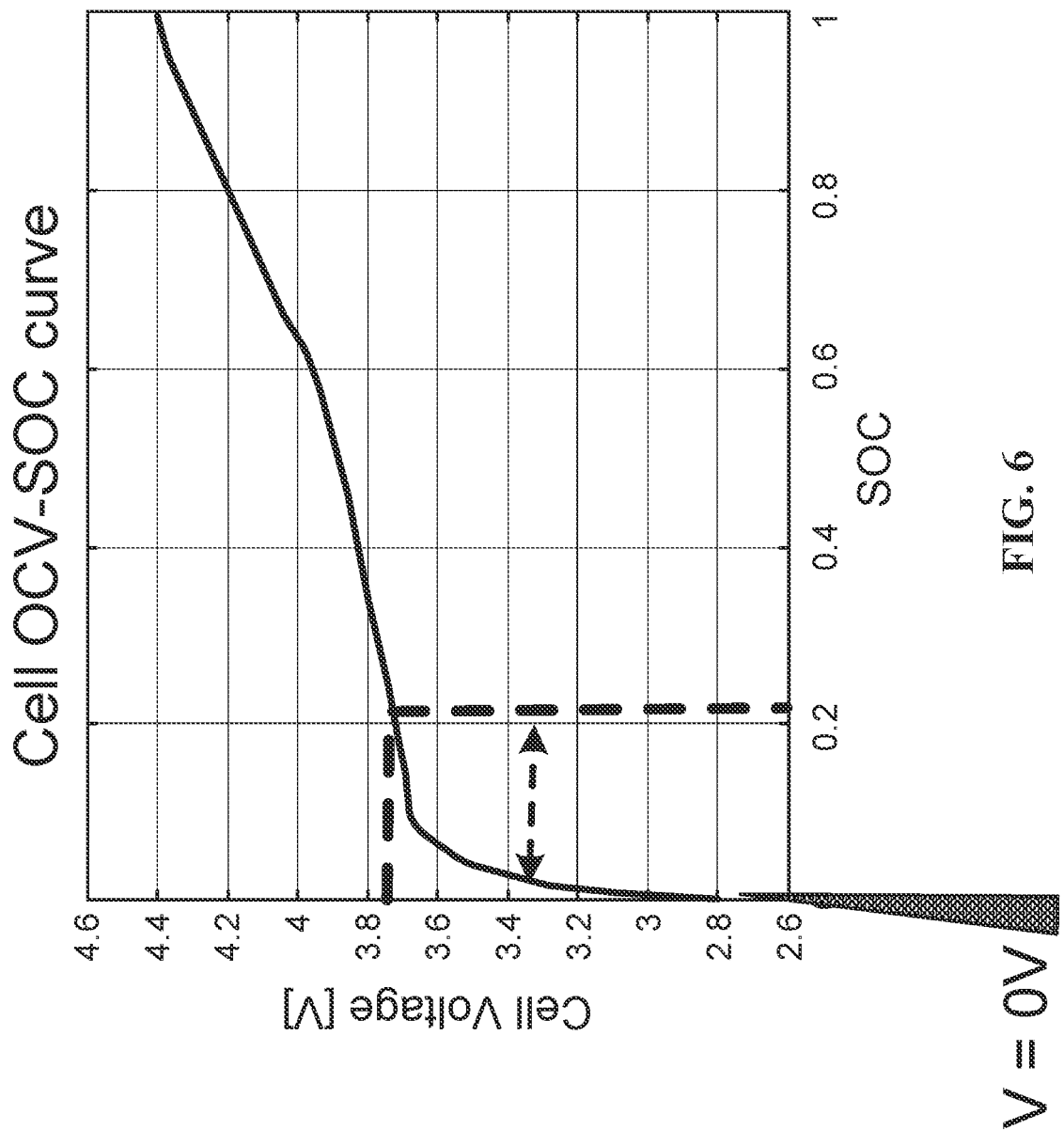
FIG. 6 shows a plot illustrating an example variation of battery module output voltage with flight duration for the power distribution system of FIG. 1.

FIG. 6 shows a plot illustrating an example variation of battery cell output voltage with flight duration for the power distribution system 102. The ability to generate suitable low-voltage output power for use by the low-voltage systems when the state of charge of the batteries 110 is relatively low, provides the ability to more completely utilize the electrical power stored in the batteries 110 for operating the low-voltage systems, thereby providing for increased capability to support continued safe flight and landing of the aircraft when the state of charge of the batteries 110 is low.

Although described herein in the context of the aerial vehicle 100, the power distribution system 102 and the batteries 110 can be employed in any suitable electrically powered vehicle, system, or device. For example, any electrically powered vehicle that receives at least part of its power from one or more batteries can be used with embodiments of the disclosure. In some instances, embodiments of the disclosure are particularly well suited for use with aerial vehicles because of the reliability and failure isolation provided.

Figure 7:
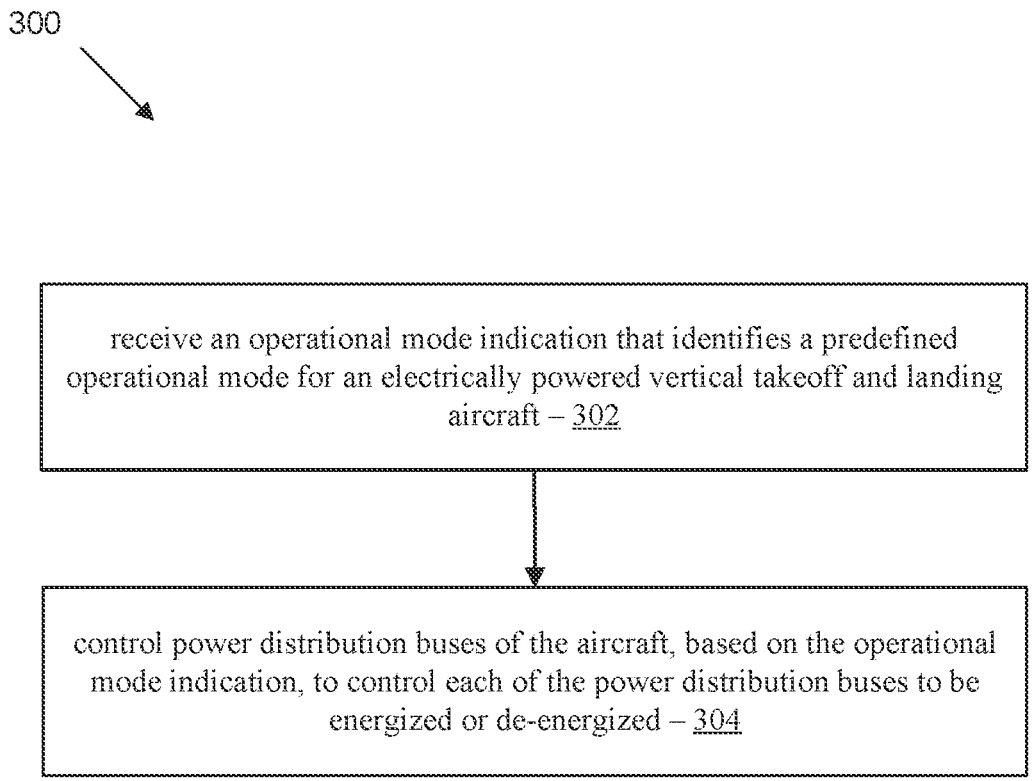
FIG. 7 shows a simplified schematic diagram of a method of controlling power distribution in an electrically powered vertical takeoff and landing aircraft, in accordance with embodiments.

FIG. 7 shows a simplified schematic diagram of a method 300 of controlling power distribution in an electrically powered vertical takeoff and landing aircraft, in accordance with embodiments. The method 300 can be practiced via any suitable electrically powered vertical takeoff and landing aircraft, such as those described herein.

The method 300 includes receiving an operational mode indication that identifies an operational mode of the aircraft. The operational mode can be one of predetermined operational modes for the aircraft. The method 300 further includes controlling power distribution buses of the aircraft, based on the operational mode indication, to control each of the power distribution buses to be energized or de-energized.

In some embodiments of the method 300, the power distribution buses can include a propulsion power bus, an air-conditioning power bus, and at least one subsystems bus. The propulsion power bus can be configured to supply power to propulsion system motors of the aircraft. The air-conditioning power bus can be configured to supply power to an air-conditioning system of the aircraft. The at least one subsystems bus can be configured to supply power to subsystems of the aircraft.

In some embodiments of the method 300, the at least one subsystems bus can include a first subsystems bus and a second subsystems bus. Each of the first subsystems bus and the second subsystems bus can be configured to supply power to the subsystems of the aircraft to provide redundancy.

In some embodiments of the method 300, the predetermined operational modes can include a normal flight mode and an emergency flight mode. In the normal flight mode, each of the propulsion power bus, the air-conditioning power bus, and the at least one subsystems bus can be energized. In the emergency flight mode, the air-conditioning power bus can be de-energized and each of the propulsion power bus and the at least one subsystems bus can be energized. The predetermined operational modes can further include an emergency landing mode in which the at least one subsystems bus is energized and each of the propulsion power bus and the air-conditioning power bus is de-energized.

In some embodiments of the method 300, the predetermined operational modes can include at least one of a maintenance lockout mode, a maintenance accessory mode, or a hot maintenance mode. In the maintenance lockout mode, each of the propulsion power bus, the air-conditioning power bus, and the at least one subsystems bus can be de-energized. In the maintenance accessory mode, the propulsion power bus can be de-energized and each of the air-conditioning power bus and the at least one subsystems bus can be energized. In the hot maintenance mode, each of the air-conditioning power bus and the at least one subsystems bus can be energized, and the propulsion power bus can be selectively energized or de-energized.

In some embodiments of the method 300, the predetermined operational modes can include one or more passenger transfer modes for use during ingress and/or egress of passengers. The one or more passenger transfer modes can include one or more of a power off mode, a standby mode, or a battery charging mode. In the power off mode, each of the propulsion power bus and the air-conditioning power bus can be deenergized. In the standby mode, the propulsion power bus can be de-energized and each of the air-conditioning power bus and the at least one subsystems bus can be energized. In the battery charging mode, the propulsion power bus can be de-energized, and the air-conditioning power bus can be energized.

In some embodiments of the method 300, the predetermined operational modes can include one or more mission modes. The one or more mission modes can include one or more of an armed mode and a normal flight mode. In the armed mode, the propulsion power bus can be de-energized and each of the air-conditioning power bus and the at least one subsystems bus can be energized. In the normal flight mode, each of the propulsion power bus, the air-conditioning power bus, and the at least one subsystems bus can be energized.

In some embodiments of the method 300, the aircraft includes a high-voltage battery that supplies a high-voltage power to at least one of the propulsion power bus or the air-conditioning power bus. The aircraft can include a low-voltage tap via which the high-voltage battery supplies a low-voltage power to the at least one subsystems bus. The low-voltage tap can include a direct current (DC) to DC converter that regulates a voltage of the low-voltage power supplied to the at least one subsystems bus. The voltage of the low-voltage power can be less than 25 percent of a voltage of the high-voltage power.

In some embodiments of the method 300, the aircraft includes high-voltage batteries that supply high-voltage power to the propulsion power bus and the air-conditioning power bus. The aircraft can include low-voltage taps via which the high-voltage batteries supply low-voltage power to the at least one subsystems bus. Each of the low-voltage taps can include a direct current (DC) to DC converter that regulates a voltage of the low-voltage power supplied to the at least one subsystems bus. The voltage of the low-voltage power can be less than 25 percent of a voltage of the high-voltage power.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of controlling power distribution in an electrically powered vertical takeoff and landing aircraft, the method comprising:
receiving an operational mode indication that identifies an operational mode, wherein the operational mode is one of predetermined operational modes for an aircraft;
controlling power distribution buses of the aircraft, based on the operational mode indication, to control each of the power distribution buses to be energized or de-energized; and
supplying high-voltage power to a propulsion power bus and an air-conditioning power bus, and supplying low-voltage power to at least two subsystems via a direct-current-to-direct-current (DC-DC) converter that electrically isolates the low-voltage power from the high-voltage power;
wherein the controlling the power distribution buses comprises, responsive to the operational mode indication corresponding to a transition from a flight mode to an emergency flight mode with an initiation of an emergency landing procedure, de-energizing the air-conditioning power bus and a subset of the at least two subsystems while continuing to supply the low-voltage power to at least one subsystem of the at least two subsystems via the DC-DC converter.

2. The method of claim 1, wherein:
the power distribution buses comprise at least one subsystems bus;
the propulsion power bus is configured to supply power to propulsion system motors of the aircraft;
the air-conditioning power bus is configured to supply power to an air-conditioning system of the aircraft; and
the at least one subsystems bus is configured to supply power to subsystems of the aircraft.

3. The method of claim 2, wherein:
the at least one subsystems bus comprises a first subsystems bus and a second subsystems bus; and
each of the first subsystems bus and the second subsystems bus is configured to supply power to the subsystems of the aircraft to provide redundancy.

4. The method of claim 2, wherein:
the predetermined operational modes comprise a normal flight mode and the emergency flight mode;
in the normal flight mode, each of the propulsion power bus, the air-conditioning power bus, and the at least one subsystems bus is energized; and
in the emergency flight mode, the air-conditioning power bus is de-energized and each of the propulsion power bus and the at least one subsystems bus is energized.

5. The method of claim 4, wherein the predetermined operational modes further comprise an emergency landing mode in which the at least one subsystems bus is energized and each of the propulsion power bus and the air-conditioning power bus is de-energized.

6. The method of claim 2, wherein:
the predetermined operational modes comprise at least one of a maintenance lockout mode, a maintenance accessory mode, or a hot maintenance mode;
in the maintenance lockout mode, each of the propulsion power bus, the air-conditioning power bus, and the at least one subsystems bus is de-energized;

in the maintenance accessory mode, the propulsion power bus is de-energized and each of the air-conditioning power bus and the at least one subsystems bus is energized; and in the hot maintenance mode, each of the air-conditioning power bus and the at least one subsystems bus is energized, and the propulsion power bus can be selectively energized or de-energized.

7. The method of claim 2, wherein:
the predetermined operational modes comprise one or more passenger transfer modes for use during ingress and/or egress of passengers;
the one or more passenger transfer modes comprise one or more of a power off mode, a standby mode, or a battery charging mode;
in the power off mode, each of the propulsion power bus and the air-conditioning power bus is deenergized;
in the standby mode, the propulsion power bus is de-energized and each of the air-conditioning power bus and the at least one subsystems bus is energized; and
in the battery charging mode, the propulsion power bus is de-energized, and the air-conditioning power bus is energized.

8. The method of claim 2, wherein:
the predetermined operational modes comprise one or more mission modes;
the one or more mission modes comprise one or more of an armed mode and a normal flight mode;
in the armed mode, the propulsion power bus is de-energized and each of the air-conditioning power bus and the at least one subsystems bus is energized; and
in the normal flight mode, each of the propulsion power bus, the air-conditioning power bus, and the at least one subsystems bus is energized.

9. The method of claim 2, wherein:
the aircraft comprises a high-voltage battery that supplies the high-voltage power to at least one of the propulsion power bus or the air-conditioning power bus; and
the aircraft comprises a low-voltage tap via which the high-voltage battery supplies the low-voltage power to the at least one subsystems bus.

10. The method of claim 9, wherein the low-voltage tap comprises the DC-DC converter that regulates a voltage of the low-voltage power supplied to the at least one subsystems bus.

11. The method of claim 10, wherein the voltage of the low-voltage power is less than 25 percent of a voltage of the high-voltage power.

12. The method of claim 2, wherein:
the aircraft comprises high-voltage batteries that supply the high-voltage power to the propulsion power bus and the air-conditioning power bus; and
the aircraft comprises low-voltage taps via which the high-voltage batteries supply the low-voltage power to the at least one subsystems bus.

13. The method of claim 12, wherein each of the low-voltage taps comprises a DC-DC converter that regulates a voltage of the low-voltage power supplied to the at least one subsystems bus.

14. The method of claim 13, wherein the voltage of the low-voltage power is less than 25 percent of a voltage of the high-voltage power.

15. An aerial vehicle comprising:
propulsion units that are electrically powered;
an air-conditioning system;
subsystems that are electrically powered;
a propulsion power bus configured to supply electrical power to the propulsion units;
an air-conditioning power bus configured to supply electrical power to the air-conditioning system;
at least one subsystems bus configured to supply electrical power to the subsystems;
a control unit comprising at least one processor; and
a memory device storing non-transitory instructions executable by the at least one processor to cause the at least one processor to control each of the propulsion power bus, the air-conditioning power bus, and the at least one subsystems bus, based on an operational mode indication, to be energized or de-energized, wherein the operational mode indication indicates one of predetermined operational modes for the aerial vehicle;
wherein the aerial vehicle is configured to supply high-voltage power to the propulsion power bus and an air-conditioning power bus and supply low-voltage power to at least two subsystems via a direct-current-to-direct-current (DC-DC) converter that electrically isolates the low-voltage power from the high-voltage power; and
wherein the controlling comprises, responsive to the operational mode indication corresponding to a transition from a flight mode to an emergency flight mode with an initiation of an emergency landing procedure, de-energizing the air-conditioning power bus and a subset of the at least two subsystems while continuing to supply the low-voltage power to at least one subsystem of the at least two subsystems via the DC-DC converter.

16. The aerial vehicle of claim 15, wherein:
the at least one subsystems bus comprises a first subsystems bus and a second subsystems bus; and
each of the first subsystems bus and the second subsystems bus is configured to supply power to the subsystems to provide redundancy.

17. The aerial vehicle of claim 15, wherein:
the predetermined operational modes comprise a normal flight mode and the emergency flight mode;
in the normal flight mode, each of the propulsion power bus, the air-conditioning power bus, and the at least one subsystems bus is energized; and
in the emergency flight mode, the air-conditioning power bus is de-energized and each of the propulsion power bus and the at least one subsystems bus is energized.

18. The aerial vehicle of claim 17, wherein the predetermined operational modes further comprise an emergency landing mode in which the at least one subsystems bus is energized and each of the propulsion power bus and the air-conditioning power bus is de-energized.

19. The aerial vehicle of claim 15, wherein:
the predetermined operational modes comprise at least one of a maintenance lockout mode, a maintenance accessory mode, or a hot maintenance mode;
in the maintenance lockout mode, each of the propulsion power bus, the air-conditioning power bus, and the at least one subsystems bus is de-energized;
in the maintenance accessory mode, the propulsion power bus is de-energized and each of the air-conditioning power bus and the at least one subsystems bus is energized; and
in the hot maintenance mode, each of the air-conditioning power bus and the at least one subsystems bus is energized, and the propulsion power bus can be selectively energized or de-energized.

20. The aerial vehicle of claim 15, wherein:

the predetermined operational modes comprise one or more passenger transfer modes for use during ingress and/or egress of passengers;

the one or more passenger transfer modes comprise one or more of a power off mode, a standby mode, or a battery charging mode;

in the power off mode, each of the propulsion power bus and the air-conditioning power bus is deenergized;

in the standby mode, the propulsion power bus is de-energized and each of the air-conditioning power bus and the at least one subsystems bus is energized; and in the battery charging mode, the propulsion power bus is de-energized, and the air-conditioning power bus is energized.

21. The aerial vehicle of claim 15, wherein:

the predetermined operational modes comprise one or more mission modes;

the one or more mission modes comprise one or more of an armed mode and a normal flight mode;

in the armed mode, the propulsion power bus is de-energized and each of the air-conditioning power bus and the at least one subsystems bus is energized; and in the normal flight mode, each of the propulsion power bus, the air-conditioning power bus, and the at least one subsystems bus is energized.

22. The aerial vehicle of claim 15, comprising:

a high-voltage battery that supplies the high-voltage power to at least one of the propulsion power bus or the air-conditioning power bus; and a low-voltage tap via which the high-voltage battery supplies the low-voltage power to the at least one subsystems bus.

23. The aerial vehicle of claim 22, wherein the low-voltage tap comprises the DC-DC converter that regulates a voltage of the low-voltage power supplied to the at least one subsystems bus.

24. The aerial vehicle of claim 23, wherein the voltage of the low-voltage power is less than 25 percent of a voltage of the high-voltage power.

25. The aerial vehicle of claim 15, comprising:

high-voltage batteries that supply the high-voltage power to the propulsion power bus and the air-conditioning power bus; and low-voltage taps via which the high-voltage batteries supply the low-voltage power to the at least one subsystems bus.

26. The aerial vehicle of claim 25, wherein each of the low-voltage taps comprises a DC-DC converter that regulates a voltage of the low-voltage power supplied to the at least one subsystems bus.

27. The aerial vehicle of claim 26, wherein the voltage of the low-voltage power is less than 25 percent of a voltage of the high-voltage power.

* * * * *